(12) United States Patent
Yanagawa et al.

(10) Patent No.: US 6,327,237 B2
(45) Date of Patent: Dec. 4, 2001

(54) OPTICAL PICKUP FOR RECORDING OR REPRODUCING SYSTEM

(75) Inventors: Naoharu Yanagawa; Eiji Muramatsu, both of Saitama (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/854,688

(22) Filed: May 15, 2001

Related U.S. Application Data

(62) Division of application No. 08/995,218, filed on Dec. 19, 1997, now Pat. No. 6,266,313.

(30) Foreign Application Priority Data

Dec. 20, 1996 (JP) .................................................... 8-341068

(51) Int. Cl.$^7$ .................................................... G11B 7/00
(52) U.S. Cl. ............................... 369/112.19; 369/112.16; 369/117; 369/110.2
(58) Field of Search .................. 369/112.16, 112.19, 369/110.2, 117, 44.23, 44.24

(56) References Cited

U.S. PATENT DOCUMENTS

| | | |
|---|---|---|
| 4,978,187 | 12/1990 | Minemura et al. . |
| 5,231,620 | 7/1993 | Ohuchida . |
| 5,428,588 | 6/1995 | Ohuchida . |
| 5,546,373 * | 8/1996 | Koyama .......................... 369/112.19 |
| 5,661,711 | 8/1997 | Tanaka et al. . |
| 5,673,247 | 9/1997 | Sekimoto et al. . |
| 5,835,472 | 11/1998 | Horie et al. . |
| 5,856,965 | 1/1999 | Tsuchiya et al. . |
| 5,870,370 | 2/1999 | Takahashi et al. . |
| 5,870,371 | 12/1995 | Tsuchiya et al. . |
| 5,892,749 | 4/1999 | Yamanaka . |

* cited by examiner

*Primary Examiner*—Nabil Hindi
(74) *Attorney, Agent, or Firm*—Arent Fox Kintner Plotkin & Kahn, PLLC

(57) ABSTRACT

A light source is provided for emitting a first beam having a far-field pattern of an elliptic shape. The first beam is a linearly polarized light having a first polarizing direction in a major axis of the elliptic shape. A half-wave plate is provided for rotating the polarizing direction of the first beam 90 degrees, thereby changing the first beam to a second beam. A beam splitter is provided for changing the elliptic shape of the second beam into a circular shape. The beam splitter is arranged to transmit the second beam and to reflect a third beam having a polarizing direction different from that of the second beam by 90 degrees. A quarter-wave plate is provided for transmitting the second beam from the beam splitter to apply it to an optical disc, and for changing the second beam reflected from the optical disc into the third beam. The third beam reflected from the beam splitter is applied to a photodetector.

4 Claims, 6 Drawing Sheets

OPTICAL PICKUP FOR RECORDING OR REPRODUCING SYSTEM

This is a Divisional of application Ser. No. 08/995,218 filed Dec. 19, 1997 now U.S. Pat. No. 6,266,313.

BACKGROUND OF THE INVENTION

The present invention relates to an optical pickup for a system for recording information on an optical disc such as a write-once Digital Versatile-Recordable (DVD-R), and reproducing the information therefrom, and more particularly to an optical element provided in the pickup.

There has been known the use of a write-once Compact Disc-Recordable (CD-R) where information can be recorded in large quantities. An optical pickup for recording and reproducing information on and from the CD-R is described with reference to FIG. 6.

Referring to FIG. 6, the conventional optical pickup comprises a laser diode 1 which emits a laser beam. The laser beam is shaped into parallel rays by a collimator lens 2 and split into three beams by a grating 3, the beams of which are a center zeroth-order diffraction main beam and first-order diffraction sub-beams deflected in positive and negative directions from the center zeroth-order main beam. The beams are focused on a track of a disc 9 through a beam splitter 40, quarter-wave plate 5 and an objective 6. The beam splitter 40 has a polarizing film 41 which is adapted to transmit P (parallel) polarized light and to reflect S (senkrecht) polarized light. A shaping prism 42 is further provided on the beam splitter 40.

Since the recording and reproducing performance of the CD-R depends on the wavelength of the laser beam, the ordinary laser diode 1 for the CD-R is constructed to emit a laser beam having a wavelength of about 780 nm. The laser beam is generally a linearly polarized light beam which is propagated in the TE mode, that is, in a direction parallel to an active layer (not shown) of a resonator of the laser diode 1. Such a polarized beam forms a far-field pattern of an elliptic shape having the minor axis thereof in the polarizing direction. When such an elliptic beam, the polarizing direction of which coincides with that of the P polarized light with respect to the polarizing film 41, passes through the shaping prism 42 of the beam splitter 40, the component in the direction of the minor axis is enlarged at a predetermined rate thereby forming a circular pattern. Namely, the P polarized component of the laser beam, converted into the circular beam is transmitted through the beam splitter 40 and applied to the quarter-wave plate 5. At the quarter-wave plate 5, the P polarized light becomes circularly polarized light.

The polarized main beam and the sub-beams are applied to the recording surface of the disc 9 and reflected therefrom. The reflected three beams are applied to the quarter-wave plate 5 through the objective 6, so that the beams are converted from the circularly polarized beams to the linearly polarized beams. The linearly polarized beam is the S polarized beam, the polarizing direction of which is rotated 90 degrees with respect to beams applied from the beam splitter 40 to the quarter-wave plate 5. Since the beams passes through the quarter-wave plate 5 twice before and after reflection, the P polarized light is converted to S polarized light. The beams which originally consisted of P polarized light are converted into beams of S polarized light. Accordingly, when the reflected beams enter the beam splitter 40, the beams are reflected from the polarizing film 41 thereof, and applied to detecting elements of a photodiode 8 as a photodetector through a condenser lens 7.

The photodiode 8 generates signals in accordance with the detected reflected main beam and sub-beams to reproduce the information and to operate a focus servo system and a track-following servo system at recording and reproducing of information by the main beam. Namely, a focus error signal is generated in accordance with the astigmatic method or the Foucault method, and a tracking error signal is generated based on the sub-beams in accordance with the well-known differential push-pull method or the three-beam method.

Meanwhile, the development of the DVD-R is in progress. In the DVD-R, the recording density is extremely increased, thereby enabling to record a huge quantity of information. In such a high-density optical disc, it is necessary to decrease the diameter of the laser beams as the recording density is increased. Namely, the wavelength of the beams is shortened to less than 660 nm, for example, about 635 nm. Hence a laser diode which emits a laser beam of shorter wavelength than that of the laser diode 1 in FIG. 6, hereinafter called a short wavelength laser diode, must be used instead of the laser diode 1.

However, contrary to the laser diode 1, hereinafter called the long wavelength laser diode, the short wavelength diode emits a linearly polarized light in a so-called TM mode wherein the light is polarized in a direction perpendicular to the active layer of the resonator of the diode. Such a light beam forms a far-field pattern of an elliptic shape having the major axis in the polarizing direction.

If such a laser diode is to be adopted in the optical pickup shown in FIG. 6, and the laser beam is applied to the shaping prism 42 so that the polarizing direction coincides with the P polarized light direction of the polarizing film 41, each of the elliptic shapes is enlarged in the direction of the major axis thereof by the shaping prism 42. Therefore, the beams cannot be shaped into circles.

On the other hand, if the laser beams are to enter in the direction where the polarizing direction thereof coincides with that of the S polarized light, since the reflectance of the S polarized wave does not become completely zero percent as shown by the characteristics of the polarizing film 41 shown in FIG. 7, there occurs a problem that the utilizing efficiency of the light beams emitted from the light source is decreased. Namely, due to the operation of the polarizing film 41, the light from the light source (S polarized light) is not transmitted one hundred percent. FIG. 7 shows the characteristic of reflectance, that is equivalently, the transmittance thereof, with respect to the angle of incidence into the polarizing film 41. The incident angle of 56 ($\theta_P$) degrees corresponds to the angle of polarization where the reflectance of the P polarized light is zero percent, that is, where the transmittance is one hundred percent. The beam splitter 40 is so designed that the light beam enters the polarizing film 41 at the angle of polarization.

If the beam splitter 40 is to maintain its function, and at the same time serve to shape the far-field pattern of the beams to form a circle, the optical path starting from the short wavelength laser diode and leading to the shaping prism 42 must be appropriately designed. However, the designing of the path is troublesome, and the path becomes complicated, thereby enlarging the optical pickup.

SUMMARY OF THE INVENTION

An object of the present invention is to provide an optical pickup wherein the short wavelength laser diode which is different in light emitting mode from the long wavelength laser diode can be used with only a minor change in the construction of a conventional pickup.

According to the present invention, there is provided an optical pickup for recording or reproducing information on an optical disc comprising, a light source for emitting a first beam having a far-field pattern of an elliptic shape, and being a linearly polarized light having a first polarizing direction in a major axis of the elliptic shape, a half-wave plate for rotating the polarizing direction of the first beam 90 degrees, thereby changing the first beam to a second beam, a beam splitter for changing the elliptic shape of the second beam into a circular shape, and being arranged to transmit the second beam and to reflect a third beam having a polarizing direction different from that of the second beam by 90 degrees, a quarter-wave plate for transmitting the second beam from the beam splitter to apply it to the optical disc, and for changing the second beam reflected from the optical disc into the third beam, and a photodetector for receiving the third beam reflected from the beam splitter.

The beam splitter comprises a shaping prism for changing the elliptic shape into the circular shape, and a polarizing film for transmitting the second beam and reflecting the third beam.

A grating is further provided between the half-wave plate and the beam splitter, for splitting the second beam into a center main beam and two sub-beams diffracted in opposite directions from the main beam.

The half-wave plate and the grating may be made into one-piece.

The present invention further provides an optical pickup for recording or reproducing information on an optical disc comprising, a light source for emitting a first beam having a far-field pattern of an elliptic shape, and being a linearly polarized light having a first polarizing direction in a major axis of the elliptic shape, a beam splitter for changing the elliptic shape of the first beam into a circular shape, and being arranged to reflect the first beam and to transmit a second beam having a polarizing direction different from that of the first beam by 90 degrees, a quarter-wave plate for transmitting the first beam from the beam splitter to apply it to the optical disc, and for changing the first beam reflected from the optical disc into the second beam, and a photodetector for receiving the second beam from the beam splitter.

These and other objects and features of the present i invention will become more apparent from the following detailed description with reference to the accompanying drawings.

BRIEF DESCRIPTION OF DRAWINGS

FIG. 2b is a diagram explaining crystallographic axes of the phase-changing and diffracting device of FIG. 2a;

FIG. 2c is a sectional view of the phase-changing and diffracting device taken along a line II—II of FIG. 2a;

DETAILED DESCRIPTION OF THE PREFERRED EMBODIMENTS

Figure 1:
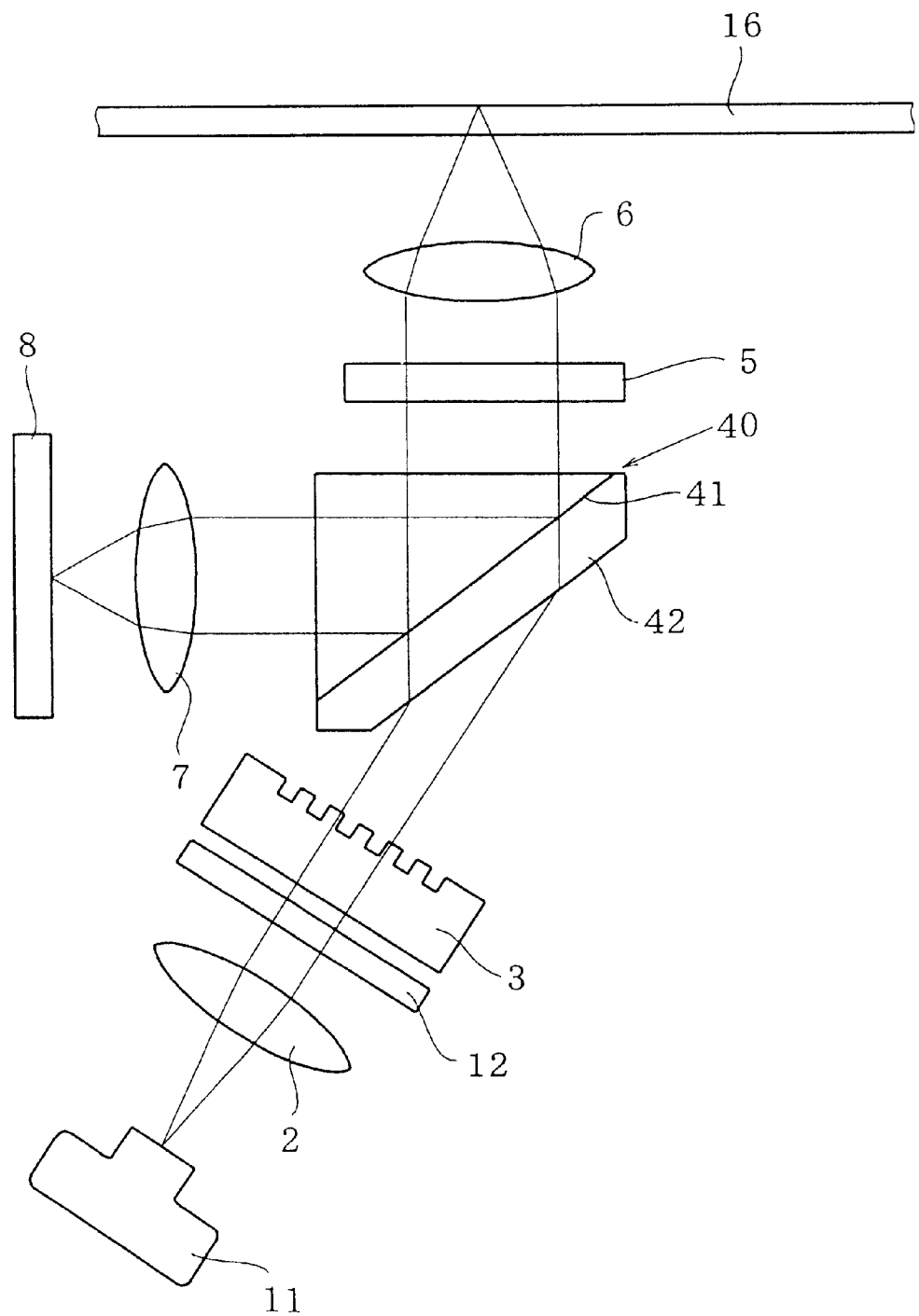
FIG. 1 is a diagram showing an optical pickup according to the present invention.
Figure 6:
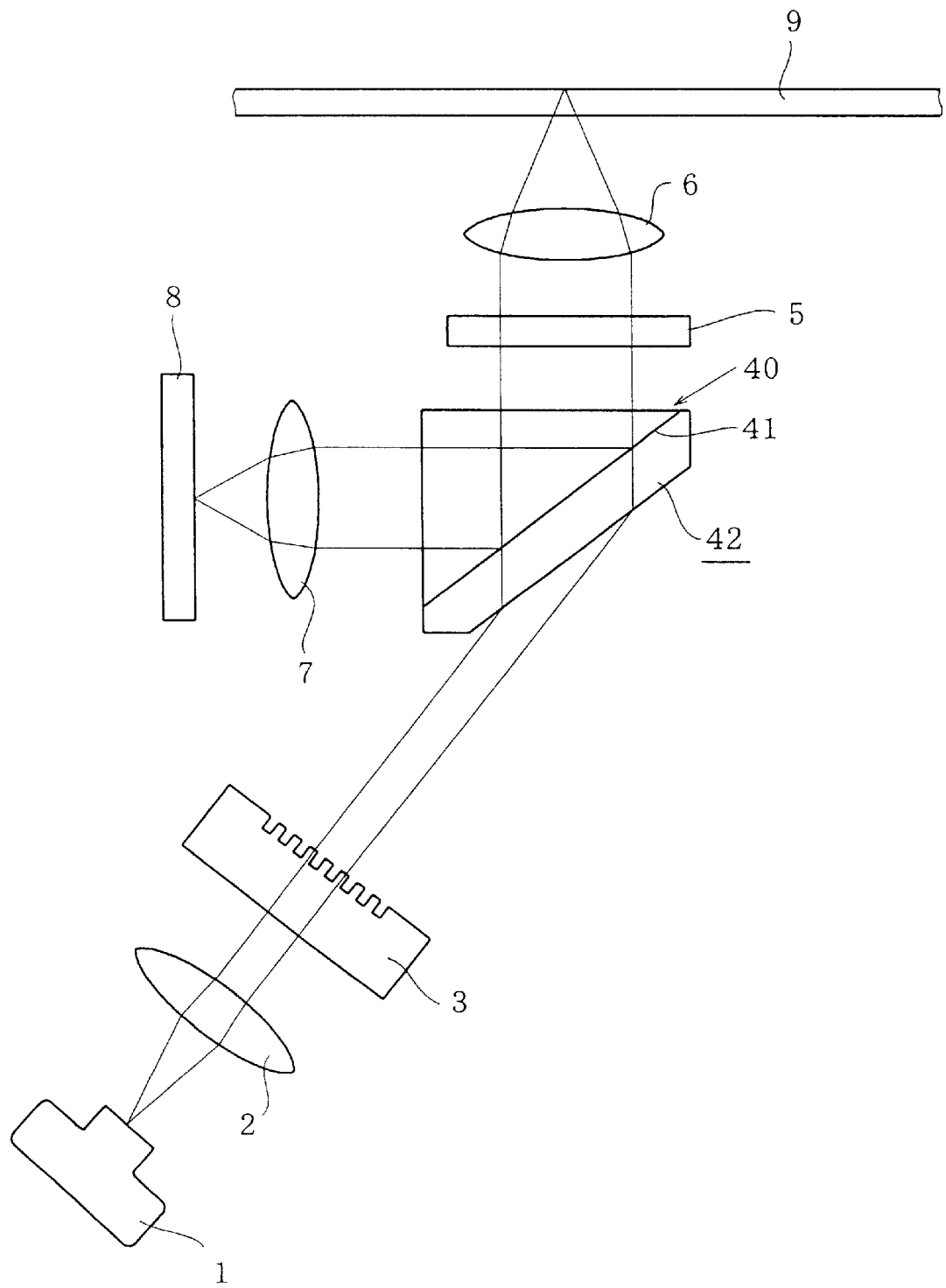
FIG. 6 is a diagram showing a conventional optical pickup.

FIG. 1 shows an optical pickup of the present invention for a DVD-R. The same references as those in FIG. 6 designate the same parts in FIG. 1.

Referring to FIG. 1, the optical pickup has a short wavelength laser diode 11 as a light source. The laser diode 11 emits a laser beam of TM mode, the wavelength of which is 635 nm, and which is polarized in a direction perpendicular to an active layer of a resonator (not shown) thereof. The emitted laser beam forms a far-field pattern of an elliptic shape having a major axis in the polarizing direction of the light beam.

The light beam passes through the collimator lens 2 and is applied to a half-wave plate 12 where the polarizing direction of the light entering therein is changed 90 degrees. The rotated laser beam enters the grating 3 which diffracts the light. More particularly, the half-wave plate 12 comprises a linear birefringent crystal such as rock crystal and calcite, which causes linear double refraction. A linearly polarized light having an angle $+\alpha$ with respect to the fast axis of the birefringent crystal emerges the crystal as a linearly polarized light having an angle of $-\alpha$ with respect to the fast axis. For example, when the half-wave plate 12 is so disposed that the linearly polarized light emitted from the laser diode 11 enters the half-wave plate 12 at an angle of 45 degrees with respect to the fast axis, the polarizing direction thereof is rotated 90 degrees. That is to say, the direction of the elliptic shape of the far-field pattern is rotated so that the minor axis of the elliptic shape is in the polarizing direction. The thus rotated beam is applied to the grating 3 and split into three beams comprising a center main beam and two sub-beams diffracted in the opposite directions from the main beam.

The diffracted beams are applied to the beam splitter 40 having the shaping prism 42 and the polarizing film 41. Each diffracted beam is hence shaped into a circle. Since the beams are rotated by the half-wave plate 12 so as to be polarized in the direction corresponding to that of the P polarized light with respect to the polarizing film 41, the beams emerge out of the beam splitter 40 as the P polarized beams. The beams are thereafter applied to a DVD-R disc 16 through the quarter-wave plate 5 and the objective 6 and reflected therefrom. The reflected beams of the P polarized light is changed to S polarized light, because the polarizing direction is rotated 90 degrees by passing through the quarter-wave plate 5 twice.

Thus, the S polarized light is reflected from the polarizing film 41. The reflected beams are fed to the photodiode 8 through the condenser lens 7 as in the conventional pickup.

In the present invention, it is necessary that the light beam accurately enter the polarizing filter 41 of the beam splitter 40 in the direction where the polarizing direction thereof coincides with that of the P polarized light. More particularly, the angular position of the half-wave plate 12 with respect to the optical axis thereof is exactly adjusted so that the linearly polarized light beams accurately enter the half-wave plate at the angle of 45 degrees with respect to the fast axis thereof.

Figure 7:
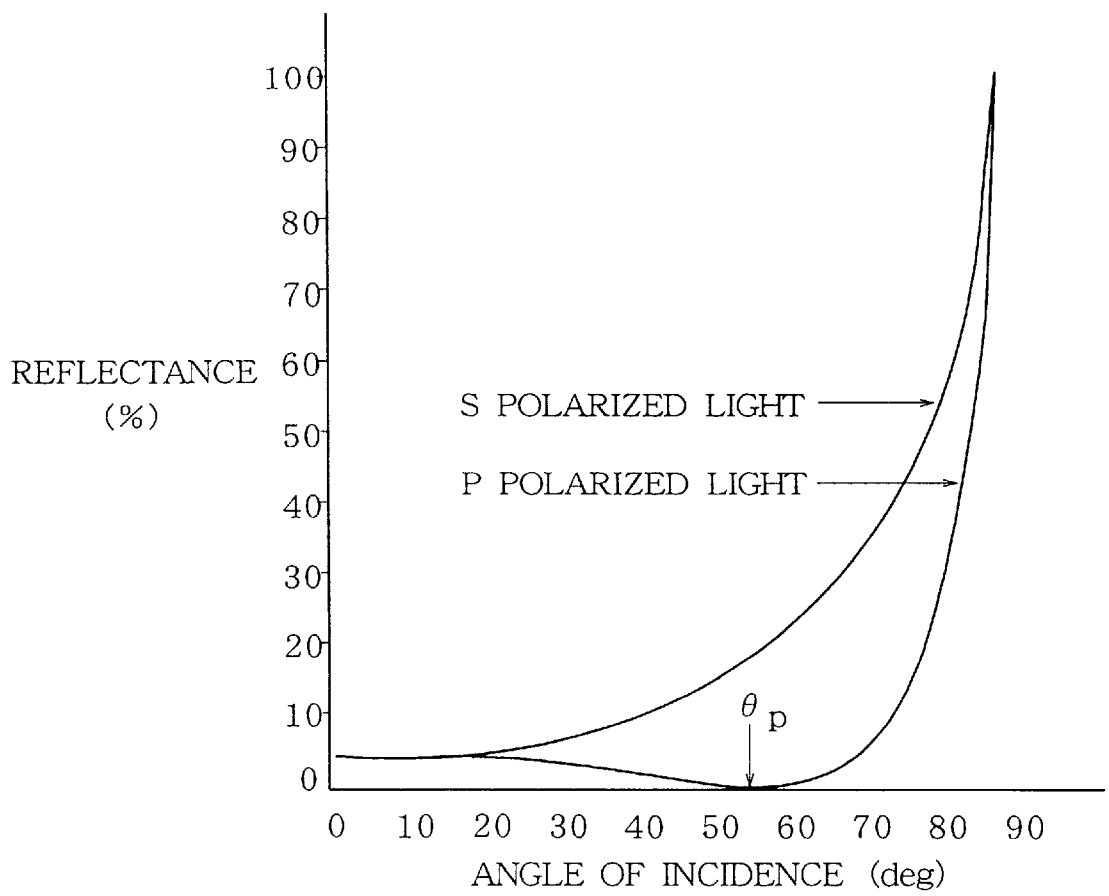
FIG. 7 is a graph showing a relationship between the reflectance and the angle of incidence of P polarized light and S polarized light.

As shown in the graph of FIG. 7, when the light accurately enters to correspond to the P polarized light, the light is transmitted hundred percent, so that the photodiode 8 receives the maximum quantity of light. Namely, the fine adjustment of the half-wave plate 12 with regard to the angular position thereof is carried out by monitoring the output signal of the photodiode 8 and detecting the maximum output signal.

Figure 3:
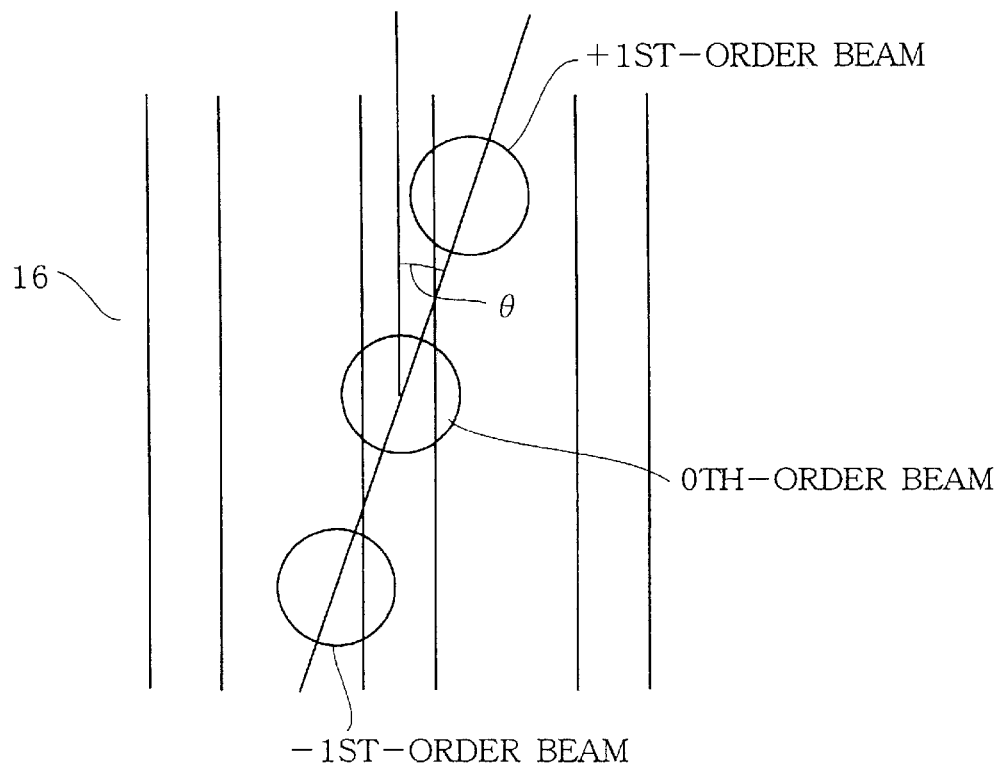
FIG. 3 is a diagram explaining positions of tracks formed on a disc and beam spots projected onto the disc.

On the other hand, the angular position of the grating 3 must also be adjusted. As shown in FIG. 3, the main zeroth-order beam and the positive and negative first-order sub-beams caused by diffraction at the grating 3 form three beam spots on the disc 16. A line connecting the center of each beam spot must retain a predetermined position with respect to the tangential direction of the recording tracks formed on the recording surface of the disc 16. Namely, the grating 3 is adjusted so that an angle θ between the line connecting the centers of the beam spots and the tangential line of the tracks is a predetermined angle which is set in consideration to the adopted tracking error deriving method and the distances between the main beam and the sub-beams.

More particularly, the tracking error signal, for example, in the case of the three beam method, is a signal which corresponds to the difference in quantities of light between that of the reflected positive first-order sub-beam and that of the reflected negative first-order sub-beam. The tracking error signal is monitored while rotating the grating 3, thereby changing the angle θ until a null point where the angle θ becomes zero is detected. At the null point, the line connecting the centers of the main and sub-beam spots becomes parallel to the tangential direction of the tracks, and the amplitude of the envelope of the tracking error signal is minimized. The grating 3 is further rotated from the null point to an angular position where the amplitude of the envelope of the tracking error signal becomes maximum.

However, there are other angular positions besides the null point where the amplitude becomes minimum. For example, when the main beam is focused on a track and the two sub-beams are focused on the adjacent tracks on the opposite sides thereof, the amplitude of the envelope of the tracking error signal becomes the same as that at the null point. Likewise, there are many angular positions where the amplitude of the envelope of the tracking error signal becomes minimum. Hence it is difficult to determine the appropriate angular position of the grating 3.

Since there are two optical elements the angular positions of which must be adjusted, the adjusting becomes even more complicated. In order to solve the problem, in the present embodiment of the invention, the half-wave late 12 and the grating 3 are integrated into a one-piece half-wave plate device 120.

Figure 2A:
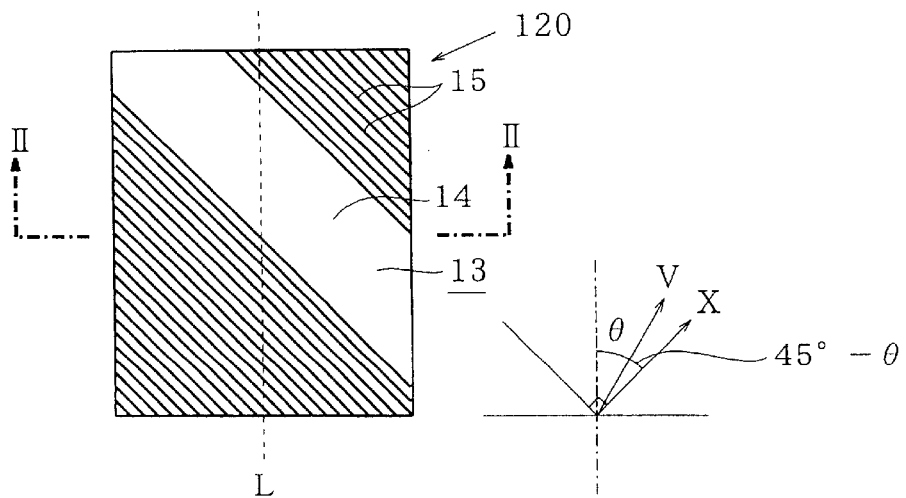
FIG. 2a is a plan view of a phase changing and diffracting device provided in the pickup of the present invention.
Figure 2B:
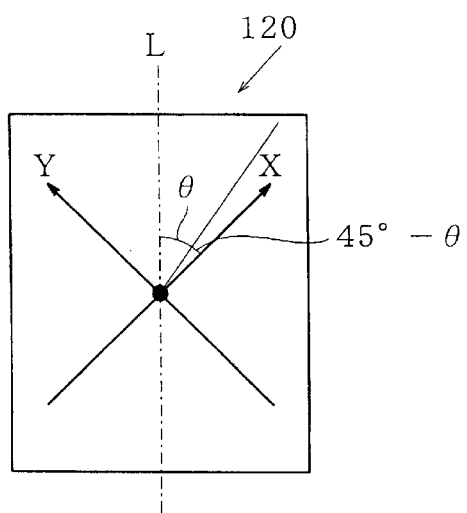
Figure 2C:
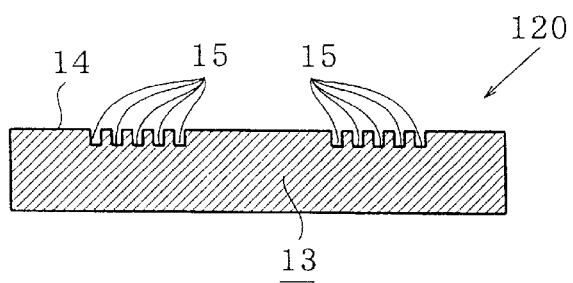

Referring to FIGS. 2a to 2c, the half-wave plate device 120 comprises a flat plate 13 having parallel surfaces made of biaxial, birefringent crystal such as artificial crystal. A plurality of parallelly arranged diagonal grooves 15 each having a rectangular section are formed on a surface 14 of the flat plate 13. The distance between each of the grooves 15 is determined in accordance with the wavelength of the incident light beam and the focal lengths of the objective 6 and the collimator lens 2.

The diagonal angle of the grooves 15 depends on the direction of the normal v shown in FIG. 2a, which is perpendicular to the direction of the grooves. More particularly, as shown in FIG. 2b, the direction of the normal v can be expressed as 45°−θ, with respect to either one of the fast crystallographic axis X and the slow crystallographic axis Y of the parallel flat plate 13. The angle θ, as already described with reference to FIG. 3, is the angle between the tangential line of the track and the line connecting the centers of the beam spots formed on the disc 16 by the zeroth-order main beam, and positive and negative first-order sub-beams. Namely, a linearly polarized light beam polarized in a direction inclined at the same absolute angle from both the fast and slow axis X and Y, that is, the light beam polarized in a direction parallel to a center line L shown in FIG. 2b inclined from the fast axis X at +45 degrees and from the slow axis Y at −45 degrees enters the parallel flat plate 13 of the half-wave plate device 120, and emerges out as a linearly polarized light rotated 90 degrees. When the grooves 15 are so formed that the normal v is in the direction 45°−θ, the optimum angular position of the half-wave plate 12 coincides with the optimum angular position of the grating 3.

Figure 4:
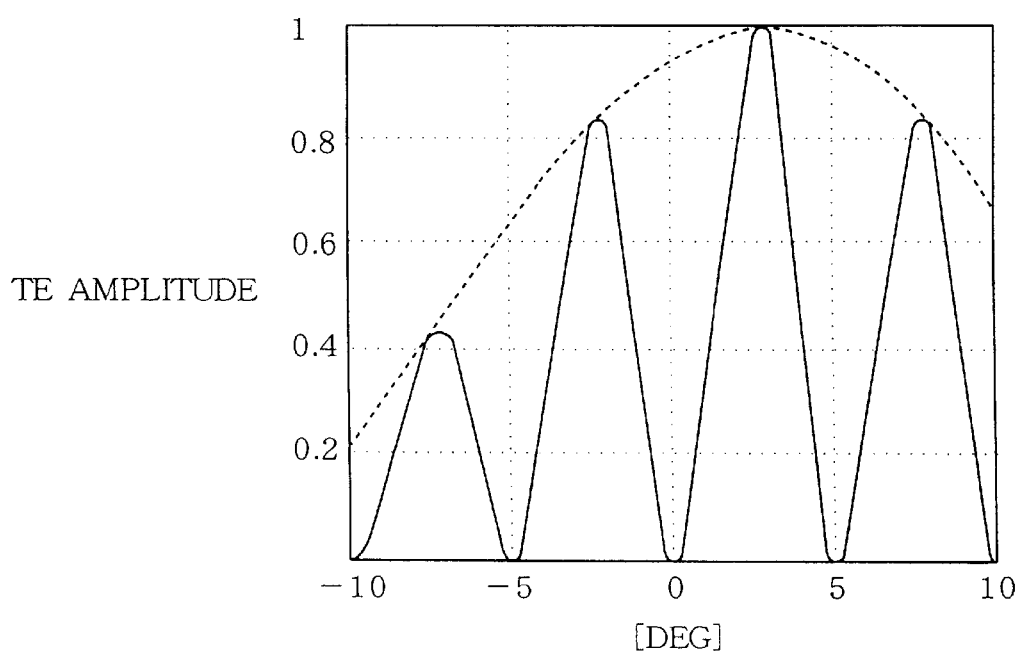
FIG. 4 is a graph showing an amplitude characteristic of a tracking error signal obtained in the optical pickup of the present invention.

Accordingly, when the angular position of the half-wave plate device 120 is adjusted by monitoring the output of the photodiode 8 and determining the angular position of the half-wave plate, the angular position of the grating is also adjusted. The amplitude of the tracking error signal obtained at the photodiode 8 based on the light beams reflected from the optical disc 16 is modulated due to the amplitude modulation operation of the half-wave plate device 120 as shown in FIG. 4. Hence, it only needs to monitor the tracking error signal and determine the maximum amplitude of the tracking error signal to determine the angular position of the half-wave plate device 120. The graph of FIG. 4 shows the levels of the amplitude of the tracking error signal with respect to the angular position of the half-wave plate device 120. The position zero degrees in the graph corresponds to the position where the main beam and the positive and negative sub-beams are aligned on the same track.

Thus, when the grooves 15 each with rectangular section are formed so that the normal v thereof is inclined at the angle 45°−θ from the direction of the crystallographic axis of the birefringent crystal, not only the adjustment of the device with respect to the angular position is completed with one operation, it is no longer necessary to detect the null position in order to detect the position of the grating. Hence the adjusting operation is simplified.

If the birefringent artificial crystal forming the half-wave plate device 120 has a rotary polarization characteristic where the plane of polarization of the linearly polarized light is distorted as the light propagates, the inclination of the groove 15 is corrected an angle corresponding to a rotary angle caused by such rotary polarization. Namely, an angle δ between the normal v perpendicular to the direction of the grooves 15 and one of the crystallographic axes of the crystal comprising the flat plate 13 is set as follows.

$$\delta = 45° - \theta \pm Y/2$$

where Y is a rotary angle. When the artificial crystal is a right-handed quarts where the atoms comprising the quarts is arranged about the optical axis in the right-hand direction, Y/2 is added. On the other hand, in the case of a left-handed quarts, where the atoms are arranged in the left-hand direction, Y/2 is subtracted.

In addition, the shaping prism 42 of the beam splitter 40 shapes the light beams so that the angle θ between the line connecting the centers of the beam spots and the tangential direction of the tracks changes. When the shaping prism 42 enlarges the beams in the radial direction of the disc at a ratio EX, which is a ratio between radiation angles in the vertical and horizontal directions of the laser beam at the laser diode, the angle θ at the recording surface of the disc is multiplied by EX (EX×θ).

When the beams are enlarged in the tangential direction of the disc at the ratio EX, the angle θ is multiplied by 1/EX (θ/EX).

Thus in order to cancel the influence of the shaping, that is, the rotation at the angle θ, the angle δ is further corrected as follows. When enlarging the beams in the radial direction, $$\delta = 45° - \theta/EX \pm Y/2$$

When enlarging in the tangential direction, $$\delta = 45° - \theta \times EX \pm Y/2$$

Hence by forming the grooves 15 at the angle δ, the deviation of the angle θ caused by the rotary polarization of the shaping prism 42 and the half-wave plate device 120 can be corrected.

Although the above described equations have been described in the case where the line connecting the center of the light beams is inclined at the angle θ in the negative direction, they can be further applied to cases where the line is inclined in the positive direction.

Figure 5:
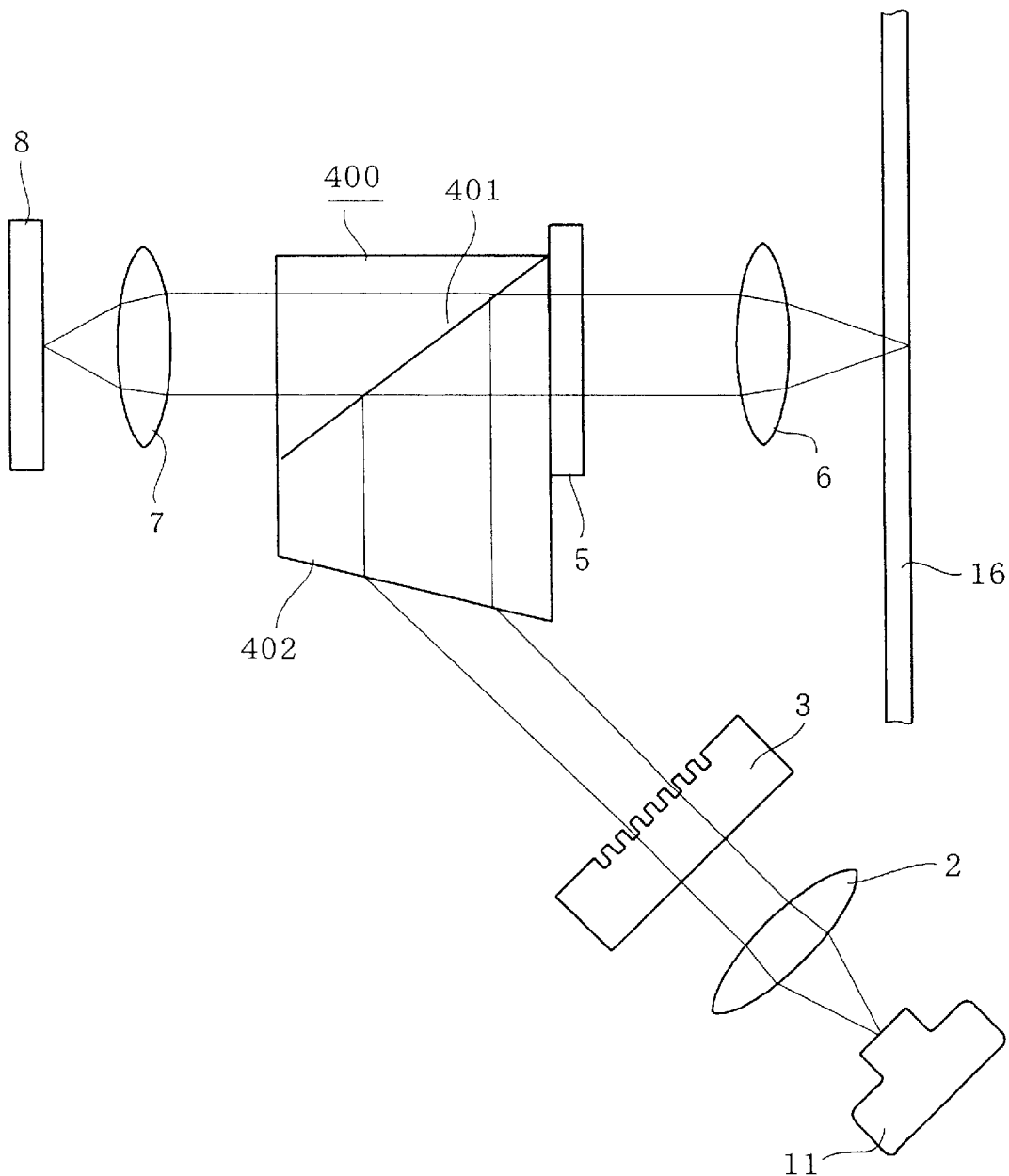
FIG. 5 is a diagram showing a second embodiment of the optical disc of the present invention.

FIG. 5 shows the optical pickup of the second embodiment of the present invention.

The laser diode 11 emits a laser beam in the TM polarizing mode. The light beam passes through the collimator lens 2 and is applied to the grating 3 where the beam is split into three beams comprising the center main beam and two sub-beams diffracted in the opposite directions from the main beam. The beams are then applied to a beam splitter 400 having a shaping prism 402 and a polarizing film 401. The shaping prism 402 has the same function as the shaping prism 42 in the first embodiment, and shapes the elliptic beams into circular beams when the laser beams enter in the direction where the polarizing direction thereof coincides with that of the S polarized light with respect to the polarizing film 401. The polarizing film 401 transmits the P polarized light and reflects the S polarized light. Accordingly, the S polarized components of the light beams which are converted into circular beams by the shaping prism 402 are applied to the disc 16 through the quarter-wave plate 5 and the objective 6.

The light beams are reflected from the disc 16 and again passed through the objective 6 and the quarter-wave plate 5. The light beams passes through the quarter-wave plate 5 twice so that the polarizing direction thereof is rotated 90 degrees in total. Hence the S polarized light is converted into the P polarized light, so as to be transmitted through the polarizing film 401 of the beam splitter 400. The transmitted light beams are applied to the photodiode 8 through the condenser lens 7.

In the present embodiment the S polarized light is applied to the disc 16. Hence as shown in FIG. 7, the reflectance does not become hundred percent even when the light enters at the angle of polarization $\theta_P$, so that the utilizing efficiency of the light beam is decreased. However, the embodiment is advantageous in that the pickup can be constructed using only optical elements provided in the conventional pickup without increasing the parts.

From the foregoing it will be understood that the present invention provides an optical pickup for an optical disc such as a DVD-R wherein the laser diode which emits light having a short wavelength is employed and still retain the beam splitter provided in a conventional pickup having a laser diode which emits light of a long wavelength.

While the invention has been described in conjunction with prefer red specific embodiment thereof, it will be understood that this description is intended to illustrate and not limit the scope of the invention, which is defined by the following claims.

What is claimed is:

1. A method of manufacturing an optical pickup for recording or reproducing information on an optical disc, comprising the steps of:

selecting a first light source for emitting a beam having a far-field pattern of an elliptic shape and a predetermined long wavelength and propagated in a TE mode in which light is polarized in a first polarizing direction along a minor axis of the elliptic shape and or a light source for emitting a beam having a far-field pattern of an elliptic shape and a predetermined short wavelength lower than the predetermined long wavelength and propagated in a TM mode in which light is polarized in a second polarizing direction along a major axis of the elliptic shape and perpendicular to the first polarizing direction in the TE mode;

providing a shaping prism for changing the elliptic shape of the beam from the first light source or the second light source, whichever is selected, into a circular shape;

arranging a beam splitter in such a way as to transmit the beam from the selected light source and to reflect a beam having a polarizing direction different from that of the beam from the selected light source by 90 degrees;

determining whether the first light source or the second light source has been selected, and arranging a half-wave plate for rotating the polarizing direction of the beam of the selected light source by 90 degrees between the selected light source and the beam splitter;

arranging a quarter-wave plate for transmitting the beam from the beam splitter to the optical disc and for changing a beam reflected from the optical disc into the beam whose polarizing direction is different from that of the beam from the selected light; and arranging a photodetector receiving the beam reflected from the beam splitter.

2. The method according to claim 1, wherein the beam splitter comprises the shaping prism and a polarizing film for transmitting the beam from the half-wave plate and reflecting the beam from the beam splitter when the second light source is selected.

3. The method according to claim 1, further comprising a step providing a grating between the half-wave plate and the beam splitter for splitting the beam from the half-wave plate when the second light source is selected.

4. method of manufacturing an optical pickup for recording or reproducing information on an optical disc, comprising the steps of:

selecting a first light source for emitting a beam having a far-field pattern of an elliptic shape and a predetermined long wavelength and propagated in a TE mode in which light is polarized in a first polarizing direction along a minor axis of the elliptic shape and or a light source for emitting a beam having a far-field pattern of an elliptic shape and a predetermined short wavelength lower than the predetermined long wavelength and propagated in a TM mode in which light is polarized in a second polarizing direction along a major axis of the elliptic shape and perpendicular to the first polarizing direction in the TE mode;

providing a shaping prism for changing the elliptic shape of the beam from the first light source or the second light source, whichever is selected, into a circular shape;

arranging a beam splitter in such a way as to transmit the beam from the selected light source and to reflect a beam having a polarizing direction different from that of the beam from the selected light source by 90 degrees;

determining whether the first light source or the second light source has been selected, and arranging a half-wave plate for rotating the polarizing direction of the beam of the selected light source by 90 degrees between the selected light source and the beam splitter;

arranging a quarter-wave plate for transmitting the beam from the beam splitter to the optical disc and for changing a beam reflected from the optical disc into the beam whose polarizing direction is different from that of the beam from the selected light;

arranging a photodetector receiving the beam reflected from the beam splitter; and providing a grating between the half-wave plate and the beam splitter for splitting the beam from the half-wave plate when the second light source is selected, wherein the half-wave plate and the grating are integral.

* * * * *